United States Patent
Joung et al.

(10) Patent No.: US 8,472,477 B2
(45) Date of Patent: Jun. 25, 2013

(54) SAF SYNCHRONIZATION LAYER PACKET STRUCTURE AND SERVER SYSTEM THEREFOR

(75) Inventors: Ye-Sun Joung, Daejon (KR); Won-Sik Cheong, Daejon (KR); Jihun Cha, Daejon (KR); Kyuheon Kim, Daejon (KR); Young-Kwon Lim, Gyeonggi-do (KR)

(73) Assignees: Electronics and Telecommunications Research Institute, Daejon (KR); Net & TV Inc., Seoul (KR)

( * ) Notice: Subject to any disclaimer, the term of this patent is extended or adjusted under 35 U.S.C. 154(b) by 1670 days.

(21) Appl. No.: 11/658,101

(22) PCT Filed: Jan. 17, 2005

(86) PCT No.: PCT/KR2005/000158
§ 371 (c)(1),
(2), (4) Date: Jan. 22, 2007

(87) PCT Pub. No.: WO2006/009344
PCT Pub. Date: Jan. 26, 2006

(65) Prior Publication Data
US 2009/0003389 A1    Jan. 1, 2009

Related U.S. Application Data

(60) Provisional application No. 60/590,448, filed on Jul. 22, 2004.

(51) Int. Cl.
*H04J 3/00*    (2006.01)
(52) U.S. Cl.
USPC .......................................... 370/476; 370/498
(58) Field of Classification Search
None
See application file for complete search history.

(56) References Cited

U.S. PATENT DOCUMENTS 5,917,830 A * 6/1999 Chen et al. .................... 370/487
6,826,233 B1 * 11/2004 Oosawa .................. 375/240.27

(Continued)

FOREIGN PATENT DOCUMENTS

CN           1323139 A      11/2001
KR      1020030042090 A      5/2003

OTHER PUBLICATIONS

ITU-Study Group 16; "Text of ISO/IEC 14496-20 CD Lightweight Application Scene Representation and Simple Aggregation Format", ITU Study Group 16-Video Coding Experts Group—ISO/IEC MPEG & ITU-T VCEG (ISO/IEC JTC1/SC29/WG11 and ITU-T SG16 Q6), No. N6500, pp. 1-3 and 28-33, Jul. 24, 2004, XP030013355.

(Continued)

*Primary Examiner* — Kevin C Harper
(74) *Attorney, Agent, or Firm* — Ladas & Parry LLP

(57) ABSTRACT

Provided is a Simple Aggregation Format (SAF) synchronization packet structure including a SAF synchronization packet header and a SAF synchronization packet payload and multiplexing diverse element streams which include a scene description elementary stream. The SAF synchronization packet header includes time information related to an access unit included in the SAF synchronization packet payload, and the SAF synchronization packet payload includes header information on the access unit and payload information indicating the access unit. Since the present invention can multiplex diverse elementary streams effectively and simply into one data stream, synchronized data transmission is possible. Since the present invention accommodates a synchronization layer packet of the MPEG-4 system, it can be easily integrated with the MPEG-4 system and utilize the advantage of the MPEG-4 synchronization layer packet such as the concept of an access unit or a degradation priority.

68 Claims, 4 Drawing Sheets

U.S. PATENT DOCUMENTS

| | | | |
|---|---|---|---|
| 2001/0009548 A1* | 7/2001 | Morris | 370/392 |
| 2001/0018769 A1 | 8/2001 | Matsui | |
| 2001/0027468 A1 | 10/2001 | Okura | |
| 2001/0031188 A1 | 10/2001 | Iwatsuki | |
| 2002/0031188 A1 | 3/2002 | Negishi et al. | |
| 2002/0133546 A1 | 9/2002 | Liang et al. | |
| 2002/0194382 A1* | 12/2002 | Kausik et al. | 709/246 |
| 2003/0009472 A1* | 1/2003 | Azami et al. | 707/101 |
| 2003/0095177 A1* | 5/2003 | Yun et al. | 348/42 |
| 2003/0229681 A1* | 12/2003 | Levitan | 709/218 |
| 2004/0022278 A1* | 2/2004 | Thomas et al. | 370/537 |
| 2004/0213549 A1 | 10/2004 | Himeno et al. | |
| 2005/0226196 A1* | 10/2005 | Suh | 370/338 |
| 2008/0141325 A1* | 6/2008 | Ludvig et al. | 725/116 |
| 2009/0285205 A1* | 11/2009 | Melick et al. | 370/352 |
| 2010/0118976 A1* | 5/2010 | Isu et al. | 375/240.25 |

OTHER PUBLICATIONS

Jean-Claude Dufourd; "CE Study of LASeR and SAF CD", ITU Study Group 16-Video Coding Experts Group—ISO/IEC/MPEG & ITU-T VCEG (ISO/IEC JTC1/SC29/WG11 and ITU-T SG16 Q6), No. M11198, pp. 1-3 and 33-39, Oct. 13, 2004, XP030039972.

Young-Kwon Lim; Proposal on SL-Compliant SAF Packet Headers, ITU Study Group 16-Video Coding Experts Group—ISO/IEC MPEG & ITU-T VCEG (ISO/IEC JTC1/SC29/WG11 and ITU-T SG16 Q6), No. M10884, Jul. 22, 2004, XP030039683.

"Information Technology a Coding of Audio-Visual Objects a Part 20: Lightweight Application Scene Representation (LASeR and Simple Aggregation Format (SAF)", 3GPP Draft: 29N6375T and $3^{rd}$ Generation Partnership Project (3GPP), Mobile Competence Centre, pp. 1-4 and 71-80, Nov. 12, 2004, XP050287112.

International Organisation for Standardisation; "Call for Proposals for Lightweight Scene Representation", ISO/IEC JTC1/SC29/WG11 N6337, pp. 1-15 Mar. 1, 2004, XP002335016.

"Draft Text of ISO/IEC 14496-1:2000", ITU Study Group 16-Video Coding Experts Group—ISO/IEC MPEG & ITU-T VCEG(ISO/IEC JTC1/SC29/WG11 and ITU-T SG16 Q6), No. N3561, pp. 220-230, Jul. 22, 2000, XP002617318.

Jean-Claude Dufourd et al., "Proposed WD 0.1 of ISO/IEC 14496-20, LASeR and SAF", ISO/IEC JTC 1/SC 29/WG 11/M10833, Jun. 17, 2004; XP030039643; 43 pages.

* cited by examiner

FIG. 4

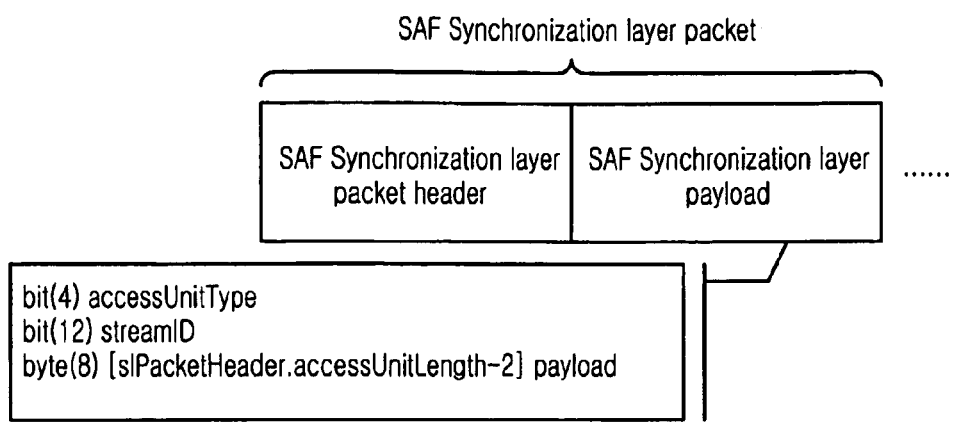

FIG. 5

| Value | Type of access unit payload | Data in payload |
|---|---|---|
| 0x00 | Reserved | - |
| 0x01 | SimpleDecoderConfigDescriptor | A SimpleDecoderConfigDescriptor |
| 0x02 | SimpleDecoderConfigDescriptor (permanent ª) | A SimpleDecoderConfigDescriptor |
| 0x03 | EndofStream | (no data) |
| 0x04 | ES Access Unit | An ES Access Unit |
| 0x05 | EndOfSAFSession | (no data) |
| 0x06 | Cache Unit | A cache object |
| 0x07 ~ 0x0F | Reserved | - |
| a "permanent" indicates that the payload of the SAF access unit shall be stored beyond the life of the current scene. | | |

SAF SYNCHRONIZATION LAYER PACKET STRUCTURE AND SERVER SYSTEM THEREFOR

TECHNICAL FIELD

The present invention relates to a Simple Aggregation Format (SAF) synchronization packet structure.

BACKGROUND ART

The Moving Picture Experts Group (MPEG) system standards includes a Binary Format for Scene (BIFS), which is a scene description standard for object-based free representation of diverse multimedia and interaction with users. The BIFS is what is acquired by modifying and supplementing the Virtual Reality Modeling Languages (VRML), which is a standard for representing a three-dimensional model, and making text data into binary data to raise transmission efficiency. When the BIFS is initially established, the major application fields of the BIFS were interactive broadcasting such as Electric Program Guide (EPG) or Internet applications such as games and portal web sites. However, most of the markets of the fields are already preoccupied with standards technologies specified for each field and there are few cases where the BIFS is applied.

Under the circumstances, an animation service in a mobile terminal emerges as a new application field for the BIFS. As for the technology for providing the animation service in mobile terminals, there is Scalable Vector Graphics (SVG), which is standardized in the Worldwide Web Consortium (W3C) and used as a mobile standard in a 3-generation Partnership Project (3GPP). Also, Korean mobile communication businesses are preparing or partially providing a Flash-based service, a technology which is widely used on the Internet. However, the SVG is text-based language and it has a low efficiency when data are transmitted or stored. The Flash technology cannot be used for a long time because it has a problem that subsequent services may be subordinated to a solution of a particular business company.

The BIFS-based animation technology is considered as an alternative that can resolve the two problems properly, but since the BIFS is not developed with a focus on the mobile application as its major application field, it has a problem that it has a somewhat high complexity.

DISCLOSURE

Technical Problem

It is, therefore, an object of the present invention to provide a configuration that can multiplex different elementary streams (ES) simply and effectively into a data stream. The elementary streams include scene description for representing a scene of a lightweight media application environment, which is a mobile environment, such as Lightweight Application ScenE Representation (LASeR), video, audio, image, font, and metadata. Herein, the LASeR is used to define a new scene representation by using nodes and commands needed to represent simple two-dimensional animation contents which are considered to be used for mobile application among the functions of the Binary Format for Scene (BIFS). The size of a memory required by a program operating in a mobile terminal should be reduced to around 50 Kb, and the complexity requirement is reduced while the degradation in the performance is minimized by simplifying quantization technique requiring complex floating point computation.

Technical Solution

In accordance with one aspect of the present invention, there is provided a structure for a Simple Aggregation Format (SAF) synchronization layer packet for multiplexing diverse elementary streams including a scene description elementary stream, the structure including: a SAF synchronization layer packet header; and a SAF synchronization layer packet payload. Herein, the SAF synchronization layer packet header includes time information related to an access unit included in the SAF synchronization packet payload; and the SAF synchronization layer packet payload includes information on the access unit and payload information indicating the access unit.

The objects, features and advantages of the present invention can be made clear from the following detailed description with reference to accompanying drawings and, thus, the technological concept of the present invention can be easily implemented by those of ordinary skill in the art to which the present invention belongs.

Advantageous Effects

According to the present invention, diverse elementary streams can be multiplexed into data stream in a simple and effective manner by using a Simple Aggregation Format (SAF) synchronization layer packet structure having an access unit type and a stream identifier (ID) field. Also, since a Lightweight Application ScenE Representation (LASeR) scene description elementary stream is transmitted with relative elementary stream such as video and audio in the form of one data stream, data transmission can be synchronized. In addition, since the present invention accommodates a synchronization layer packet of the Moving Picture Experts Group 4 (MPEG-4) system, it can be easily integrated with the MPEG-4 system and it can utilize the advantage of the MPEG-4 synchronization layer packet such as the concept of an access unit or a degradation priority.

DESCRIPTION OF DRAWINGS

The above and other objects and features of the present invention will become apparent from the following description of the preferred embodiments given in conjunction with the accompanying drawings, in which:

FIG. 4 is a diagram illustrating a SAF synchronization layer packet payload according to the present invention;

FIG. 5 is a table presenting the type of access unit in the SAF synchronization layer packet payload according to the present invention;

BEST MODE FOR THE INVENTION

Hereinafter, embodiments related to Lightweight Application ScenE Representation (LASeR) will be described in detail according to the present invention with reference to the accompanying drawings.

Figure 1:
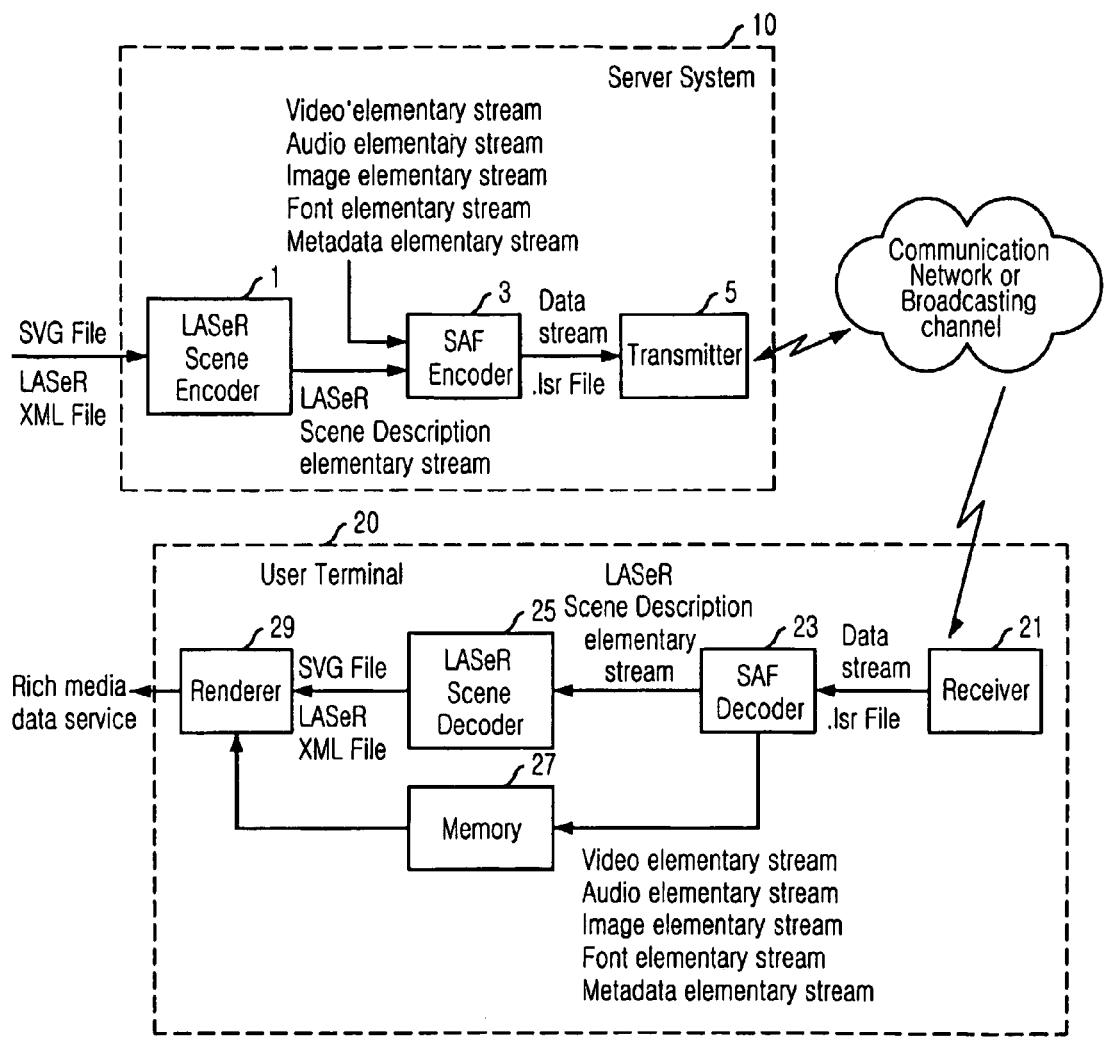
FIG. 1 is a block diagram illustrating a system in accordance with an embodiment of the present invention.

FIG. 1 is a block diagram showing a system of server and a user terminal in accordance with an embodiment of the present invention. A server system 10 includes a Lightweight Application ScenE Representation (LASeR) scene encoder 1, a Simple Aggregation Format (SAF) encoder 3, and a transmitter 5. The LASeR scene encoder 1 receives a Scalable Vector Graphics (SVG) file or a LASeR extensible Markup Language (XML) file for a scene and generates a compressed LASeR scene description elementary stream. The SAF encoder 3 receives the LASeR scene description elementary stream and elementary streams that form a LASeR scene, such as video elementary stream, audio elementary stream, image elementary stream, font elementary stream, and metadata elementary stream, and generates one data stream by using a SAF synchronization layer packet structure in accordance with the present invention. Of course, the SAF encoder 3 receives an individual elementary stream and outputs it in the form of a file, for example, a lsr'file. The data stream is transmitted by the transmitter 5 to a user terminal 20 through broadcasting channel or diverse communication networks such as an Internet Protocol (IP) network, a wireless Internet or a Code Division Multiple Access (CDMA) network.

The user terminal 20 includes a receiver 21, a SAF decoder 23, a LASeR scene decoder 25, and a renderer 29. The SAF decoder 23 receives the data stream received in the receiver 21 and generates LASeR scene description elementary stream, video elementary stream, audio elementary stream, image elementary stream, font elementary stream, and metadata elementary stream. The LASeR scene decoder 25 receives the LASeR scene description elementary stream among the outputs of the SAF decoder 23 and generates a SVG file or a LASeR XML file. The memory 25 stores elementary streams except the LASeR scene description elementary stream among the outputs of the SAF decoder 23, that is, it stores video elementary stream, audio elementary stream, image elementary stream, font elementary stream, and/or metadata elementary stream. The renderer 29 receives the SVG file or LASeR XML file and it receives diverse elementary streams stored in the memory 27, performs data processing, and provides a rich media data service.

Figure 2:
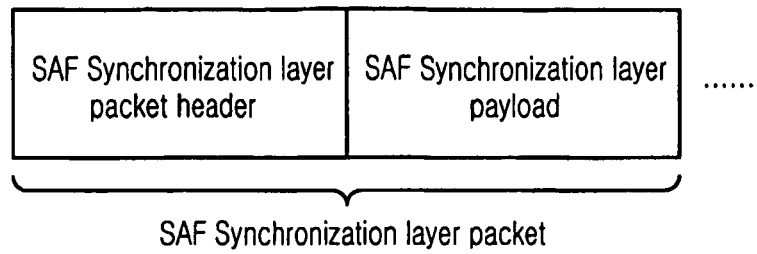
FIG. 2 is a diagram describing a Simple Aggregation Format (SAF) synchronization layer packet according to the present invention.

FIG. 2 shows a structure of a SAF synchronization layer packet according to the present invention. The SAF synchronization layer packet includes a SAF SL packet header and a SAF SL packet payload. The code of the SAF synchronization layer packet structure is as follows:

```
class SAF_SL_Packet {
    SAF_SL_PacketHeader slPacketHeader;
    byte [slPacketHeader.accessUnitLength] slPacketPayload;
}
```

Figure 3:
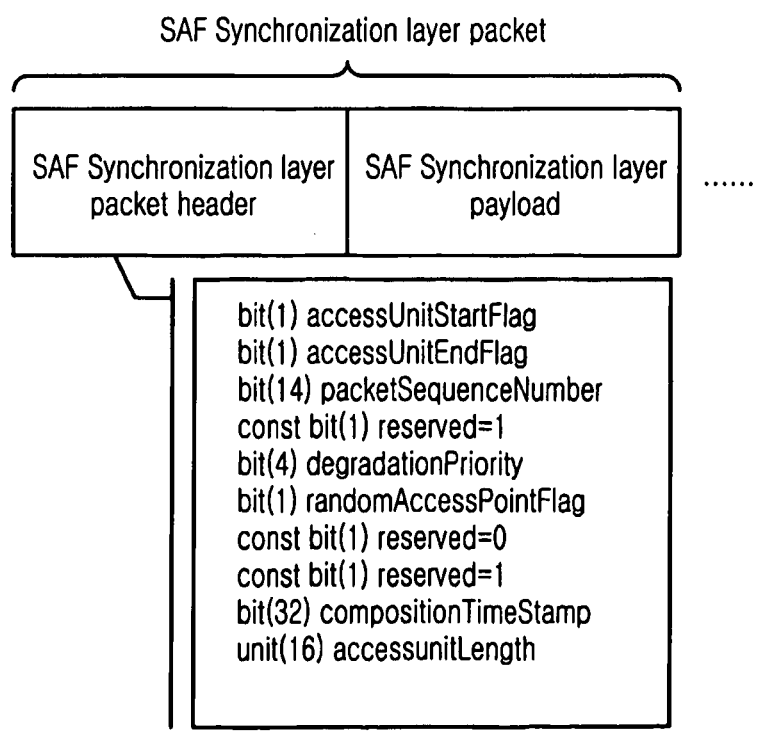
FIG. 3 is a diagram showing a SAF synchronization layer packet header according to the present invention.

FIG. 3 shows the structure of a SAF synchronization layer packet header according to the present invention. The SAF synchronization layer packet header makes it possible to check the continuity of a packet just in case where there is data loss during data transmission and to transmit time stamp and information related thereto in an encoded form. The following is a code for the structure of the SAF synchronization layer packet header.

```
class SAF_SL_PacketHeader {
    bit(1) accessUnitStartFlag;
    bit(1) accessUnitEndFlag;
    bit(14) packetSequenceNumber;
    const bit(1) reserved=1;
    bit(4) degradationPriority;
    bit(1) randomAccessPointFlag;
    const bit(1) reserved=0;
    const bit(1) reserved=1;
    bit(32) compositionTimeStamp;
    uint(16) accessUnitLength;
}
```

Hereafter, fields composing a SAF synchronization layer packet header will be described.

Access Unit Start Flag (accessUnitStartFlag): When an accessUnitStartFlag value is 1, the first byte of the current SAF synchronization layer packet payload signifies the start of a SAF access unit. An access unit stands for data represented at a certain time. For example, in a case of video data, a Video Object Plane (VOP) may be one access unit, but the present invention is not limited to it. The access unit, which is data having time information, is an individually accessible portion of data within a media stream.

Access Unit End Flag (accessUnitEndFlag): When an accessUnitEndFlag value is 1, it signifies that the last byte of the current synchronization layer packet payload is the end of a SAF access unit.

Packet Sequence Number (packetSequenceNumber): a serial number is given with a modulo counter in the order that synchronization layer packetization is performed and the serial number is called a packet serial number. The packet serial number is checked in the SAF decoder and, if the number is discontinuous, it is regarded that one or more SAF synchronization layer packets are lost. When it happens, the error is informed to a module that consumes the synchronization layer packets, which is the SAF decoder 23, the LASeR scene decoder 25, or renderer 29 of FIG. 1.

Degradation Priority (degradationPriority): The degradationPriority shows relative significance of an object transmitted as the payload of the current SAF synchronization layer packet. The information is used to compute graceful degradation of the transmitted object in the decoder. If the decoder does not have sufficient computational power to decode all the objects of a scene, the graceful degradation value of each object is determined based on the degradation priority. The smaller the degradationPriority value is, the larger the graceful degradation value of an object becomes. For example, the graceful degradation of an object within a synchronization layer packet 'b' having a degradationPriority of 10 is smaller than the graceful degradation of an object within a synchronization layer packet 'a' having a degradationPriority of 5.

Random Access Point Flag (randomAccessPointFlag): When a randomAccessPointFlag value is 1, it signifies that the data of an elementary stream transmitted as the current SAF synchronization layer packet payload are randomly accessible.

Composition Time Stamp (compositionTimestamp): The compositionTimeStamp signifies information on time which is required when objects transmitted as the SAF synchronization layer packet payload form a scene in a decoder. Composition time ($t_c$) of the first composition unit of an access unit transmitted by the current synchronization layer packet is computed by composition time stamp existing in the current synchronization layer packet based on Equation 1.

$$t_c = (compositionTimeStamp/1000 + k*2^{32}/1000) \qquad \text{Eq. 1}$$

where k denotes the number of time that a CompositionTimeStamp counter has wrapped around.

Although the stream identifiers (StreamID) of objects transmitted as two different synchronization layer packet payloads are different from each other, the composition time stamp values of the synchronization layer packets can be the same.

Access Unit Length (accessUnitLength): The accessUnitLength values denote the length of a SAF access unit within a SAF packet. When the SAF access unit is divided into several SAF synchronization layer packets, the accessUnitLength field transmits fragment size information of the SAF packets. Thus, the entire length of a complete SAF access unit can be known by adding all the values of the accessUnitLength field transmitting the fragments of a certain SAF access unit.

FIG. 4 illustrates the structure of a SAF synchronization layer packet payload according to the present invention, and the code for the packet structure is as follows:

```
class safAU {
    bit(4) accessUnitType;
    bit(12) streamID;
    byte(8)[slPacketHeader.accessUnitLength-2] payload;
}
```

Access Unit Type (accessUnitType): The accessUnitType denotes the kinds of payloads that compose a SAF access unit. As shown in FIG. 5 presenting the value of each access unit type and the type of data corresponding to each access unit type, the access unit type can be a simple decoder configuration descriptor (SimpleDecoderConfigDescriptor), the end of stream (EndofStream), an elementary stream access unit (ESAccessUnit), the end of SAF session (EndOfSAFSession), or a cache unit (CacheUnit).

Stream Identifier (streamID): The streamID indicates the unique identifier information for an elementary stream to which the current access unit belongs. For example, a video elementary stream includes such stream identifiers as video elementary stream 1, video elementary stream 2, video elementary stream 3, . . . , video elementary stream n.

Payload (payload): Payload is part of an access unit-based object data. The length of payload can be known by an accessUnitLength field information that forms a SAF synchronization layer packet header. Data of payload is divided by the accessUnitType which is shown in FIG. 5.

For example, when an accessUnitType value is 0×01 or 0×02, the payload includes a simpleDecoderConfigDescriptor, such as a LASeR sceneHeader, mediaHeader, and fontHeader. Herein, mediaHeader includes a video header, an audio header or an image header.

When the accessUnitType value is 0×04, an access unit (see "0×04" of FIG. 5) including a LASeR scene unit, a media unit, or a font unit in the payload is transmitted. When the accessUnitType value is 0×06, the payload includes a cache unit. Herein, the media unit includes a video unit, an audio unit, or an image unit.

Figure 6:
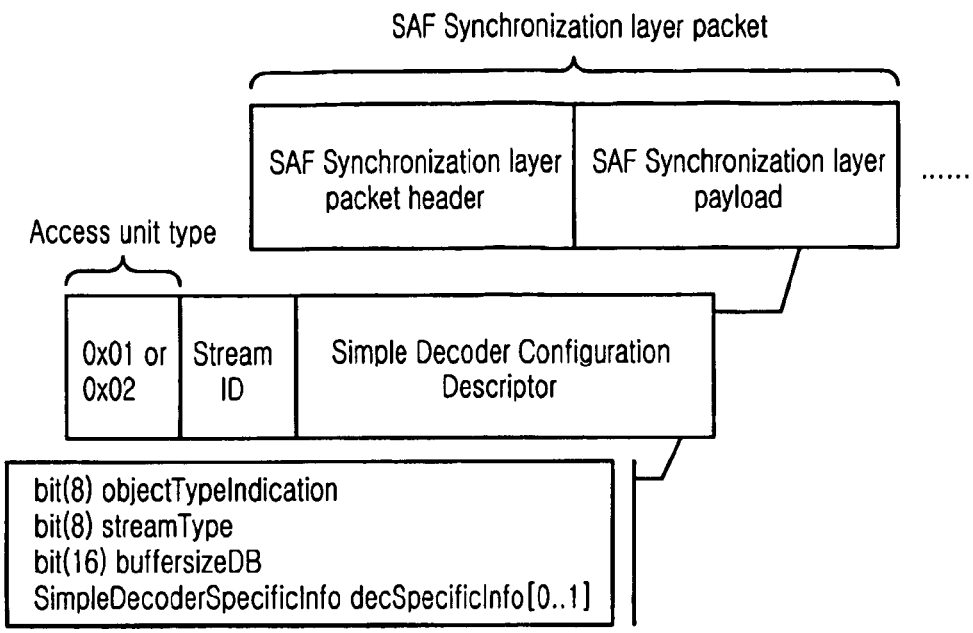
FIG. 6 is a diagram describing a structure of payload when the access unit type in the SAF synchronization layer packet payload of the present invention is 0×01 and 0×02.

FIG. 6 describes a structure of a simpleDecoderConfigDescriptor transmitted when the access unit type value of the SAF synchronization layer packet payload of the present invention is 0×01 and 0×02, and the code thereof is as follows:

```
class SimpleDecoderConfigDescriptor {
    bit(8) objectTypeIndication;
    bit(8) streamType;
```

-continued

```
    bit(16) bufferSizeDB;
    SimpleDecoderSpecificInfo decSpecificInfo[0 .. 1];
}
```

The simpleDecoderConfigDescriptor provides information on the types of a decoder for elementary stream and decoder resources that are requested. The information is needed to determine whether or not a user terminal that has received an elementary stream can decode the received elementary stream. The stream type indicates the kind of stream and a certain decoder specific information descriptor includes stream specific information to prepare a decoder for a stream specific format of the current layer.

Object type indication (objectTypeIndication): The ObjectTypeIndication indicates information on the type of decoder needed to decode the current elementary stream object based on an object type indication (objectTypeIndication) table existing in the MPEG-4 System Standard Specification, i.e., ISO/IEC 14496-1. For example, it signifies whether an MPEG-4 System version 1 decoder is in need or an MPEG-4 System version 2 decoder is in need, in case of scene description data.

Stream Type (streamType): The streamType indicates the type of current elementary stream based on a streamType table defined in the MPEG-4 System Standard Specification, i.e., ISO/IEC 14496-1. For example, it discriminates whether elementary stream is of video data or audio data.

Buffer Size Database (bufferSizeDB): The bufferSizeDB indicates the size of decoding buffer for elementary stream on a byte basis.

Decoder Specific Informatiion (decSpecificInfo): The decSpecificInfo, which is a field including specific information needed to decode an elementary stream, can be composed in a plurality of array forms as demands arise. The decSpecificInfo value is determined according to the stream type.

Figure 7:
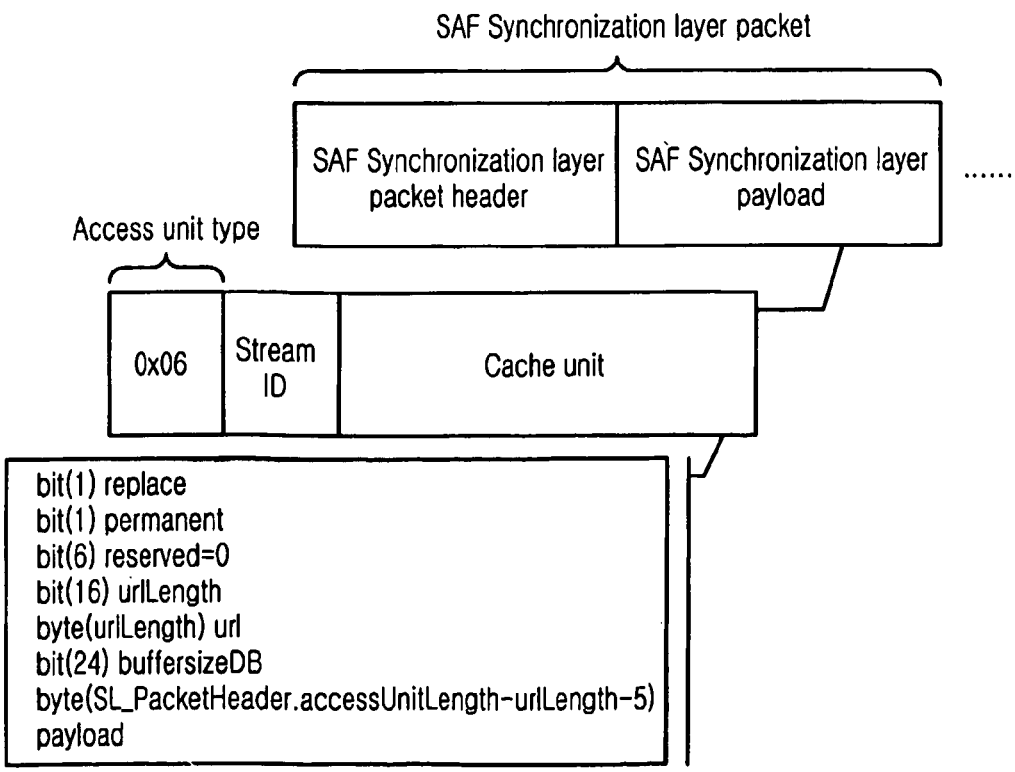
FIG. 7 is a diagram illustrating a structure of payload when the access unit type in the SAF synchronization layer packet payload of the present invention is 0×06.

FIG. 7 illustrates a structure of a cache unit transmitted when the access unit type in the SAF synchronization layer packet payload is 0×06 according to the present invention.

```
class cacheUnit {
    bit(1) replace;
    bit(1) permanent;
    bit(6) reserved =0;
    unit(16) urlLength;
    byte(urlLength) url;
    byte(SL_PacketHeader.accessUnitLength-urlLength-5] payload;
}
```

A cache object, which is data that form a payload of a cache unit packet, transmits Uniform Resource Locator (URL) and diverse elementary streams. If a user terminal requests a URL and it already has a matched cache unit to the requested URL, the user terminal does not inquire data to a server but it directly loads corresponding data that it already has by using the URL. The cache unit is stored in a memory as soon as it is searched out and the stored cache unit can be permanent. A cache object exists for duration defined by a reception time and a time obtained by adding second-based time presented in a composition time stamp field within a synchronization. layer packet header to the reception time. After the duration passes, the valid period of the cache object finishes and a SAF content including the cache object cannot be executed.

Replace: When a replace value is 1, a previous cache unit is exchanged with a cache unit transmitted as the current synchronization layer packet payload with respect to the same URL. When the replace value is 0, a cache unit transmitted as the current synchronization layer packet payload is added to the previous cache unit having the same URL.

Permanent: When a permanent value is 1 and the user terminal has sufficient resources, the current cache unit is maintained in the user terminal even after the time defined in the composition time stamp of a SAF packet has passed.

URL Length (urlLength): The urlLength indicates the length of URL data in a positive integer, which is based on bytes.

URL (url): URL indicates URL data corresponding to a scene carried and transmitted within a payload.

Payload: payload is substantial data and the size of a payload field can be known by an access unit length of the synchronization layer packet header. When a specific scene is composed and the access unit type is 0×06, the payload data replace the current scene, or if the access unit type of payload is not 0×06, the payload data are added to the current scene.

While the present invention has been described with respect to certain preferred embodiments, it will be apparent to those skilled in the art that various changes and modifications may be made without departing from the scope of the invention as defined in the following claims.

What is claimed is:

1. A server system, comprising:
    an encoder for generating a Simple Aggregation Format (SAF) synchronization layer packet to multiplex diverse elementary streams including a scene description elementary stream;
    wherein the SAF synchronization layer packet includes:
        an SAF synchronization layer packet header; and
        an SAF synchronization layer packet payload,
        wherein the SAF synchronization layer packet header includes time information related to an access unit included in the SAF synchronization packet payload in which a composition time of a first composition time unit of the access unit is calculated based on a CompositionTimeStamp corresponding to time information, and a number of times of that a CompositionTimeStamp counter has wrapped around;
        wherein the SAF synchronization layer packet payload includes header information on the access unit and payload information indicating the access unit;
        wherein the payload information includes information on a URL and a cache unit on the data referred to at the URL;
        wherein the cache unit further includes information for replacing a previous cache unit with a cache unit included in a current payload information with respect to the same URL, or information for adding a cache unit included in the current payload information to a previous cache unit.

2. The server system as recited in claim 1, wherein the SAF synchronization layer packet header further includes information on whether the first byte of the SAF synchronization layer packet payload is a start of the access unit.

3. The server system as recited in claim 1, wherein the SAF synchronization layer packet header further includes information on whether the last byte of the SAF synchronization layer packet payload is an end of the access unit.

4. The server system as recited in claim 1, wherein the SAF synchronization layer packet header further includes continuity information of the SAF synchronization layer packet.

5. The server system as recited in claim 1, wherein the SAF synchronization layer packet header further includes relative significance information of the access unit.

6. The server system as recited in claim 1, wherein the SAF synchronization layer packet header further includes information on whether data included in the SAF synchronization layer packet payload are available for random access.

7. The server system as recited in claim 1, wherein the time information of the composition time is needed when the access unit forms a scene in a decoder.

8. The server system as recited in claim 1, wherein the SAF synchronization layer packet header includes information on the length of the access unit.

9. The server system as recited in claim 1, wherein the header information on the access unit includes type information which is based on the access unit.

10. The server system as recited in claim 1, wherein the header information on the access unit includes an identifier of elementary stream belonging to the access unit.

11. The server system as recited in claim 1, wherein the payload information includes simple decoder configuration descriptor (SimpleDecoderConfigDescriptor) information that includes a scene header, a media header, or a font header.

12. The SAF synchronization layer packet structure as recited in claim 1, wherein the payload information includes SimpleDecoderConfigDescriptor on decoding of elementary stream belonging to the access unit.

13. The server system as recited in claim 12, wherein the SimpleDecoderConfigDescriptor includes information on a decoding type needed for the elementary stream.

14. The server system as recited in claim 12, wherein the SimpleDecoderConfigDescriptor includes information on decoder resources required for the elementary stream.

15. The server system as recited in claim 12, wherein the SimpleDecoderConfigDescriptor includes information needed to decode an object or a scene included in the elementary stream based on an object type indication (objectTypeIndication) table of a Moving Picture Experts Group 4 (MPEG-4) system standard (ISO/IEC 14496-1).

16. The server system as recited in claim 12, wherein the SimpleDecoderConfigDescriptor includes information on the type of the elementary stream.

17. The server system as recited in claim 12, wherein the SimpleDecoderConfigDescriptor includes information on the size of a decoding buffer for the elementary stream.

18. The server system as recited in claim 12, wherein the SimpleDecoderConfigDescriptor includes specific information needed to decode the elementary stream.

19. The server system as recited in claim 1, wherein the payload information includes an access unit.

20. The server system as recited in claim 1, wherein the cache unit further includes information for maintaining the cache unit in the user terminal when the user terminal has sufficient resources.

21. The server system as recited in claim 1, wherein the cache unit includes information on the length of the URL.

22. The server system as recited in claim 1, wherein the elementary stream further includes at least one of a video elementary stream, an audio elementary stream, an image elementary stream, a font elementary stream, and a metadata elementary stream.

23. A server system, comprising:
    a Simple Aggregation Format (SAF) encoder for converting diverse elementary streams including a scene description elementary stream into one data stream or a file based on a SAF synchronization layer packet structure; and
    a transmitter for transmitting the data stream or the file to a user terminal, wherein the SAF synchronization layer packet structure comprises a SAF synchronization layer packet header and a SAF synchronization layer packet payload, and the SAF synchronization layer packet header includes time information related to an access unit included in the SAF synchronization packet payload, whereas the SAF synchronization layer packet payload includes header information on the access unit and payload information indicating the access unit in which a composition time of a first composition time unit of the access unit is calculated based on a CompositionTimeStamp corresponding to time information, and a number of times of that a CompositionTimeStamp counter has wrapped around;

wherein the payload information includes information on a URL and a cache unit on the data referred to at the URL;

wherein the cache unit further includes information for replacing a previous cache unit with a cache unit included in a current payload information with respect to the same URL, or information for adding a cache unit included in the current payload information to a previous cache unit.

24. The server system as recited in claim 23, further comprising:
a scene encoder for generating the scene description elementary stream which is obtained by receiving a Scalable Vector Graphics (SVG) file or a LASeR eXclusive Markup Language (XML) file.

25. The server system as recited in claim 23, wherein the SAF synchronization layer packet header includes continuity information of the SAF synchronization layer packet.

26. The server system as recited in claim 23, wherein the SAF synchronization layer packet header includes information on whether data included in the SAF synchronization layer packet payload is available for random access.

27. The server system as recited in claim 23, wherein the time information of the composition time is needed when the access unit forms a scene in a decoder.

28. The server system as recited in claim 23, wherein the SAF synchronization layer packet header includes information on the length of the access unit.

29. The server system as recited in claim 23, wherein the header information on the access unit includes type information of the access unit.

30. The server system as recited in claim 23, wherein the header information on the access unit includes an identifier of elementary stream belonging to the access unit.

31. The server system as recited in claim 23, wherein the payload information includes a simple decoder configuration descriptor (SimpleDecoderConfig Descriptor) that includes a scene header, a media header, or a font header.

32. The server system as recited in claim 23, where the payload information includes a SimpleDecoderConfigDescriptor for decoding of elementary stream belonging to the access unit.

33. The server system as recited in claim 32, where the SimpleDecoderConfigDescriptor includes information on the type of a decoder needed for the elementary stream.

34. The server system as recited in claim 32, where the SimpleDecoderConfigDescriptor includes information on decoder resources required for the elementary stream.

35. The server system as recited in claim 32, where the SimpleDecoderConfigDescriptor includes information needed to decode an object or a scene included in the elementary stream based on an object type indication (objectTypeIndication) table of a Moving Picture Experts Group 4 (MPEG-4) system standard, which is ISO/IEC 14496-1.

36. The server system as recited in claim 32, wherein the SimpleDecoderConfigDescriptor includes information on the type of the elementary stream.

37. The server system as recited in claim 32, wherein the SimpleDecoderConfigDescriptor includes information on the size of a decoding buffer for the elementary stream.

38. The server system as recited in claim 32, wherein the SimpleDecoderConfigDescriptor includes specific information needed to decode the elementary stream.

39. The server system as recited in claim 23, wherein the payload information includes an access unit.

40. The server system as recited in claim 23, wherein the cache unit further includes information for maintaining the cache unit in the user terminal when the user terminal has sufficient resources.

41. The server system as recited in claim 23, wherein the cache unit includes information on the length of the URL.

42. The server system as recited in claim 23, wherein the elementary stream further includes at least one among a video elementary stream, an audio elementary stream, an image elementary stream, a font elementary stream, and a metadata elementary stream.

43. A user terminal, comprising:
a receiver for receiving a data stream or a file which is obtained in a Simple Aggregation Format (SAF) synchronization layer packet structure;
an SAF decoder for receiving the data stream or the file and generating diverse elementary streams including a scene description elementary stream; and
a renderer for processing and indicating the elementary streams,
wherein the SAF synchronization layer packet structure includes a SAF synchronization layer packet header and a SAF synchronization layer packet payload, and
the SAF synchronization layer packet header includes time information related to an access unit included in the SAF synchronization packet payload, whereas the SAF synchronization layer packet payload includes header information on the access unit and payload information indicating the access unit in which a composition time of a first composition time unit of the access unit is calculated based on a CompositionTimeStamp corresponding to time information, and a number of times of that a CompositionTimeStamp counter has wrapped around;
wherein the payload information includes information on a URL and a cache unit on the data referred to at the URL;
wherein the cache unit further includes information for replacing a previous cache unit with a cache unit included in a current payload information with respect to the same URL, or information for adding a cache unit included in the current payload information to a previous cache unit.

44. The user terminal as recited in claim 43, further comprising:
a scene decoder for receiving the scene description elementary stream from the SAF decoder, generating a Scalable Vector Graphics (SVG) file or a LASeR XML file, and providing the SVG file or the LASeR XML file to the renderer.

45. The user terminal as recited in claim 43, further comprising:
a memory for storing elementary streams except the scene description elementary stream among elementary streams outputted from the SAF decoder, and providing the stored elementary streams to the renderer.

46. The user terminal as recited in claim 43, wherein the SAF synchronization layer packet header further includes continuity information of the SAF synchronization layer packet.

47. The user terminal as recited in claim 43, wherein the SAF synchronization layer packet header further includes information on whether data included in the SAF synchronization layer packet payload are available for random access.

48. The user terminal as recited in claim 43, wherein the time information is needed when the access unit forms a scene in a decoder.

49. The user terminal as recited in claim 43, wherein the SAF synchronization layer packet header includes information on the length of the access unit.

50. The user terminal as recited in claim 43, wherein the header information on the access unit includes type information which is based on the access unit.

51. The user terminal as recited in claim 43, wherein the header information on the access unit includes an identifier of elementary stream belonging to the access unit.

52. The user terminal as recited in claim 43, wherein the payload information includes simple decoder configuration descriptor (SimpleDecoderConfig Descriptor) information that includes a scene header, a media header, or a font header.

53. The user terminal as recited in claim 43, wherein the payload information includes SimpleDecoderConfigDescriptor on decoding of elementary stream belonging to the access unit.

54. The user terminal as recited in claim 53, wherein the SimpleDecoderConfigDescriptor includes information on the type of a decoder needed for the elementary stream.

55. The user terminal as recited in claim 53, wherein the SimpleDecoderConfigDescriptor includes information on decoder resources required for the elementary stream.

56. The user terminal as recited in claim 53, wherein the SimpleDecoderConfigDescriptor includes information needed to decode an object or a scene included in the elementary stream based on an object type indication (objectTypeIndication) table of a Moving Picture Experts Group 4 (MPEG-4) system standard (ISO/IEC 14496-1).

57. The user terminal as recited in claim 53, wherein the SimpleDecoderConfigDescriptor includes information on the type of the elementary stream.

58. The user terminal as recited in claim 53, wherein the SimpleDecoderConfigDescriptor includes information on the size of a decoding buffer for the elementary stream.

59. The user terminal as recited in claim 53, wherein the SimpleDecoderConfigDescriptor includes specific information needed to decode the elementary stream.

60. The user terminal as recited in claim 43, wherein the payload information includes an access unit.

61. The user terminal as recited in claim 43, wherein the cache unit further includes information for maintaining the cache unit in the user terminal when the user terminal has sufficient resources.

62. The user terminal as recited in claim 43, wherein the cache unit includes information on the length of the URL.

63. The user terminal as recited in claim 43, wherein the elementary stream further includes at least one among a video elementary stream, an audio elementary stream, an image elementary stream, a font elementary stream, and a metadata elementary stream.

64. A method for providing a Simple Aggregation Format (SAF) synchronization layer packet, comprising the steps of:
a) converting diverse elementary streams including a scene description elementary stream into a data stream or a file by using a SAF synchronization layer packet structure; and
b) transmitting the data stream or the file to a user terminal,
wherein the SAF synchronization layer packet structure comprises a SAF synchronization layer packet header and a SAF synchronization layer packet payload;
wherein the SAF synchronization layer packet header includes time information related to an access unit included in the SAF synchronization packet payload, whereas the SAF synchronization layer packet payload includes header information on the access unit, payload information indicating the access unit and information on a URL and a cache unit on the data referred to at the URL in which a composition time of a first composition time unit of the access unit is calculated based on a CompositionTimeStamp corresponding to time information, and a number of times of that a CompositionTimeStamp counter has wrapped around;
wherein the cache unit further includes information for replacing a previous cache unit with a cache unit included in a current payload information with respect to the same URL, or information for adding a cache unit included in the current payload information to a previous cache unit.

65. The method as recited in claim 64, further comprising the step of:
c) generating the scene description elementary stream which is obtained by receiving a Scalable Vector Graphics (SVG) file or a LASeR eXclusive Markup Language (XML) file.

66. A method for providing a Simple Aggregation Format (SAF) synchronization layer packet, comprising the steps of:
a) receiving a data stream or a file having a SAF synchronization layer packet structure;
b) generating diverse elementary streams including a scene description elementary stream based on the received data stream or the file; and
c) processing and indicating the elementary streams,
wherein the SAF synchronization layer packet structure comprises a SAF synchronization layer packet header and a SAF synchronization layer packet payload;
wherein the SAF synchronization layer packet header includes time information related to an access unit included in the SAF synchronization packet payload in which a composition time of a first composition time unit of the access unit is calculated based on a CompositionTimeStamp corresponding to time information, and a number of times of that a CompositionTimeStamp counter has wrapped around, whereas the SAF synchronization layer packet payload includes header information on the access unit, payload information indicating the access unit and information on a URL and a cache unit on the data referred to at the URL;
wherein the cache unit further includes information for replacing a previous cache unit with a cache unit included in a current payload information with respect to the same URL, or information for adding a cache unit included in the current payload information to a previous cache unit.

67. The method as recited in claim 66, further comprising the step of:
d) generating a Scalable Vector Graphics (SVG) file or a LASeR eXclusive Markup Language (XML) file based on the scene description elementary stream which is obtained in the step b), and transmitting the SVG file or the LASeR XML file to the step c).

68. The method as recited in claim 66, further comprising the step of:
 e) storing elementary streams except the scene description elementary stream among elementary streams outputted in the step b) and transmitting the stored elementary streams to the step c).

* * * * *